Dec. 8, 1964 A. HAMORI 3,160,874

PULSE CODE MODULATION DECODER

Filed Dec. 29, 1961 2 Sheets-Sheet 1

INVENTOR
A. HAMORI
BY
J. V. De Simone
ATTORNEY

Dec. 8, 1964 A. HAMORI 3,160,874

PULSE CODE MODULATION DECODER

Filed Dec. 29, 1961 2 Sheets-Sheet 2

INVENTOR
A. HAMORI
BY
J. V. De Simone
ATTORNEY

United States Patent Office 3,160,874
Patented Dec. 8, 1964

3,160,874
PULSE CODE MODULATION DECODER

Andras Hamori, Cambridge, Mass., assignor to Bell Telephone Laboratories, Incorporated, New York, N.Y., a corporation of New York Filed Dec. 29, 1961, Ser. No. 163,136
6 Claims. (Cl. 340—347)

This invention relates to pulse code modulation (PCM) systems and, in particular, to decoders for transforming digital information to analogue form.

In a typical network decoder, the pulses of an incoming PCM wave are detected and then methodically routed to control the generation of currents representative of the digit values. These currents are summed and the result is the analogue counterpart of the received code word. Now these processes all sound simple enough, but the accuracy and speed at which they must be done in time division multiplex systems have necessitated elaborate and expensive circuit arrangements. It is therefore an object of the present invention to reduce the cost and complexity of PCM decoders.

In accordance with the invention, as it is exemplified in one embodiment, the first major assembly of the decoder, whose purpose it is to seek out and evaluate incoming PCM pulses and then to convey any discovered information on to a switch driver assembly, employs no active elements (e.g., transistors) to accomplish this purpose. We shall call this first major assembly the pulse distributor assembly. In the illustrative embodiment to be described, this assembly is composed of seven pulse distributor circuits, one for each message digit of the incoming code. Each of these circuits has three inputs, two of which act in concert to identify and cause the storage of an associated message digit whenever the digit is received as a pulse. We shall assume that our code is a binary code and, also, that a pulse represents the digit "1." (As the reader is doubtless aware, a digit in a binary code can be either a "1" or a "0"; and the value of the digit, if it is not zero magnitude, is determined by the order in which it appears in the code word—i.e., by its "order of significance.") The other pulse distributor input periodically interrogates the storage center to see if a pulse has there been lodged, and if one has, sends it on, simultaneously with any other pulses that may have been stored in the other distributor circuits, to the switch driver assembly.

The switch driver assembly is composed of seven switch driver circuits, one for each of the distributor circuits. The driver circuits control the generation of reference currents in associated branches of a weighted network. The summation of these currents is the analogue version of the received code word. One of the advantageous features of the switch driver arrangement is its push-pull, flip-flop switching action. This action provides an efficiency that obviates the need for transistors of high current-handling capability.

The invention will be better understood when it has been considered in the context of an illustrative embodiment. We proceed now to that embodiment. In the drawing.

Figure 1:
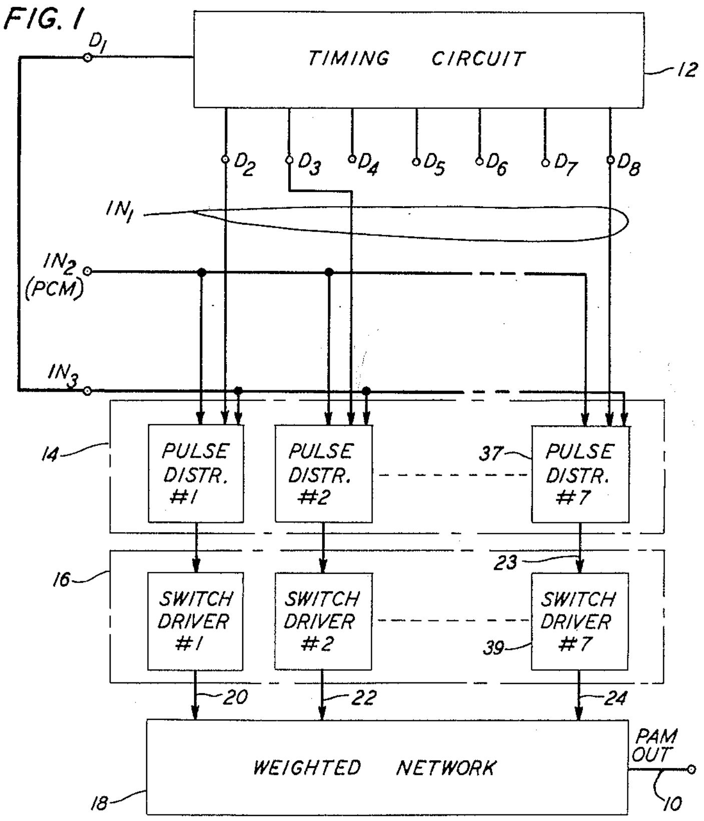
FIG. 1 is a block schematic diagram broadly depicting a decoder arranged in accordance with the invention.

The decoder of FIG. 1 may be part of a receiver of a pulse communication system. Since it is not necessary for an understanding of the invention that we consider the receiver as a whole, or, for that matter, the PCM system as a whole, neither of these entities is shown in the drawing. We may note, however, that the PAM (pulse amplitude modulated) pulse train that appears at the output terminal 10 of the decoder would normally be thereafter processed by an expandor (if compression of the signal had been undertaken at the transmitter), by a demultiplexer (if the system is one operating in time division multiplex), by filters to convert the PAM pulses to continuous waves and, ultimately, there would be something to utilize each channel of transmitted information—for example, telephone receivers. Moreover, the reader is well aware that other circuitry, such as receiver synchronizing apparatus, for example, is necessary for the successful operation of our decoder. For these myriad details reference may be made, for example, to Patent No. 2,610,295, which issued to R. L. Carbrey on September 9, 1952.

The function of the decoder of FIG. 1 is to convert PCM signals received at the terminal $IN_2$ into PAM pulses. The principal parts of the decoder are the timing circuit 12, the pulse distributor assembly 14, the switch driver assembly 16, and the weighted network 18. The decoder has three inputs: $IN_1$, $IN_2$, and $IN_3$.

We can see that the input $IN_1$ is, in reality, a set of inputs D2–D8 that emanate from the timing circuit 12. This timing circuit may be of a conventional slave oscillator type, suitable for use in PCM receivers. From its timing terminals D1–D8, timing pulses are sequentially derived. These pulses recur at the pulse repetition rate of the incoming PCM wave. Forgetting the special timing terminal D1 for the moment, we may note that the timing terminals D2–D8 are seven in number because we are going to assume a pulse code comprising seven message digits. These message digits are, in their order of significance ($2^6$, $2^5$, . . . $2^0$), associated with the terminals D2, D3, . . . D8. If, for example, the most significant digit ($2^6$) is present in an incoming code group, the search for this digit will be initiated by a D2 timing pulse. After this digit has been discovered and stored in the pulse distributor #1, it will be extracted by a D1 timing pulse (received at each distributor, via the input $IN_3$, from the terminal D1) along with any digits stored in the other pulse distributors.

We shall call the pulses sequentially appearing at the terminals D1–D8 of the timing circuit 12, the timing pulses D1–D8. These pulses define the time slots of our PCM code. A time slot, it will be recalled, is the basic unit of time in a PCM system.

As has been intimated, it is a function of the timing pulses D2–D8 to scan the incoming PCM wave to determine at the time slots concerned whether or not a pulse (binary "1") is present in the incoming PCM wave. This scanning process occurs in the pulse distributor assembly 14, of which we shall have more to say when we discuss FIG. 2. As pulses are discovered in the incoming PCM wave, they are stored in their associated distributor circuits and, as we have seen, are "read out" (i.e., taken out of storage) during the first time slot of the next succeeding code group.

Each pulse read out of a pulse distributor is passed on to an associated switch driver circuit. Although they are not fully shown, the pulse distributor assembly 14 and the switch driver assembly 16 are each made up of seven component circuits. Thus, the distributor assembly 14 consists of seven pulse distributor circuits, one for each of the message digits of the incoming pulse code, and the switch driver assembly 16 consists of seven switch driver circuits, each associated with one of the pulse distributor circuits of the assembly 14. The driver circuits of the assembly 16 control the generation of reference currents in the weighted network 18. These currents are summed at the PAM output terminal 10.

Figure 3:
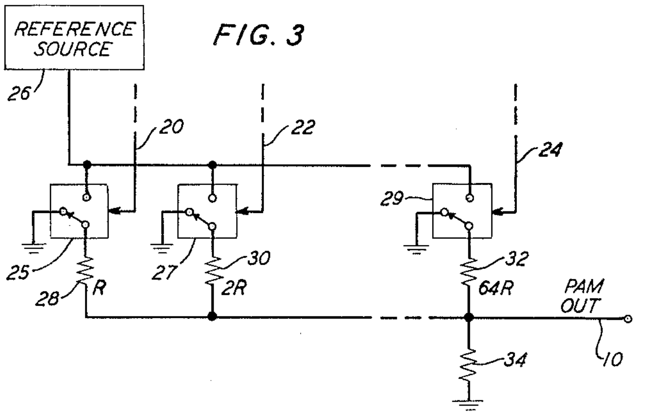
FIG. 3 is an elementary weighted network that can be used in FIG. 1.

The weighted network 18 of FIG. 1 is shown in greater detail in FIG. 3. The inputs 20, 22, and 24 of the weighted network 18 of FIG. 1 are shown again in FIG. 3. Let us assume that the reference source 26 consists simply of a unipolar source of potential. For a typical arrangement, see Patent No. 2,991,422, which issued to R. E. Yaeger on July 4, 1961.

Currents from the source 26 are supplied through the various branches (not all shown) of the weighted network whenever the transfer switches 25, 27, . . . 29 are enabled by control pulses appearing on their control inputs 20, 22, . . . 24, respectively. These control pulses, as we have seen, are supplied by the switch driver circuits of FIG. 1 whenever these circuits are enabled to do so by their associated pulse distributor circuits. When the transfer switches 25, 27, 29 are disabled, as they normally are, they connect their respective resistors to ground, as is shown.

Our assumption (a seven digit code) calls for seven network branches. We show only three—those which include the resistors 28, 30, and 32—since this is sufficient for the purpose of explanation. These three are associated with the message digits $2^7$, $2^6$, and $2^0$, respectively. The network resistors are high precision resistors whose ohmic values are a geometric progression, as we know in view of the ratio of their associated digits. Thus, the current through the resistor 30 is one-half the current through the resistor 28 when these branches are active. The relative values of the three resistors shown are indicated in multiples of "R," which is the ohmic value of the most significant resistor 28. Thus, in the weighted network of FIG. 3 the relative values of the resistors that meter the flow of reference currents through the seven branches we have assumed, are in the following ratio, going from left (resistor 28) to right resistor 32)

1:2:4:8:16:32:64

The reference currents are summed in a single series resistor 34, which is connected between ground and the PAM output terminal 10. The voltage across the resistor 34 is therefore proportional to the message sample which was transformed to code in the encoder of the transmitter (not shown).

We should note that the weighted network 18, which is shown very simply in FIG. 3, may be any of a rather large variety of types now well known in the art. It is only necessary that this network match the reference network of the encoder, since associated decoding and encoding networks normally have to provide the same message-to-code relationship (see United States Patent 3,065,422, which issued November 20, 1962 to C. P. Villars). This relationship could be linear, piecewise-linear, logarithmic, parabolic, hyperbolic, or any of a number of hybrid combinations of these mathematical relationships.

Figure 2:
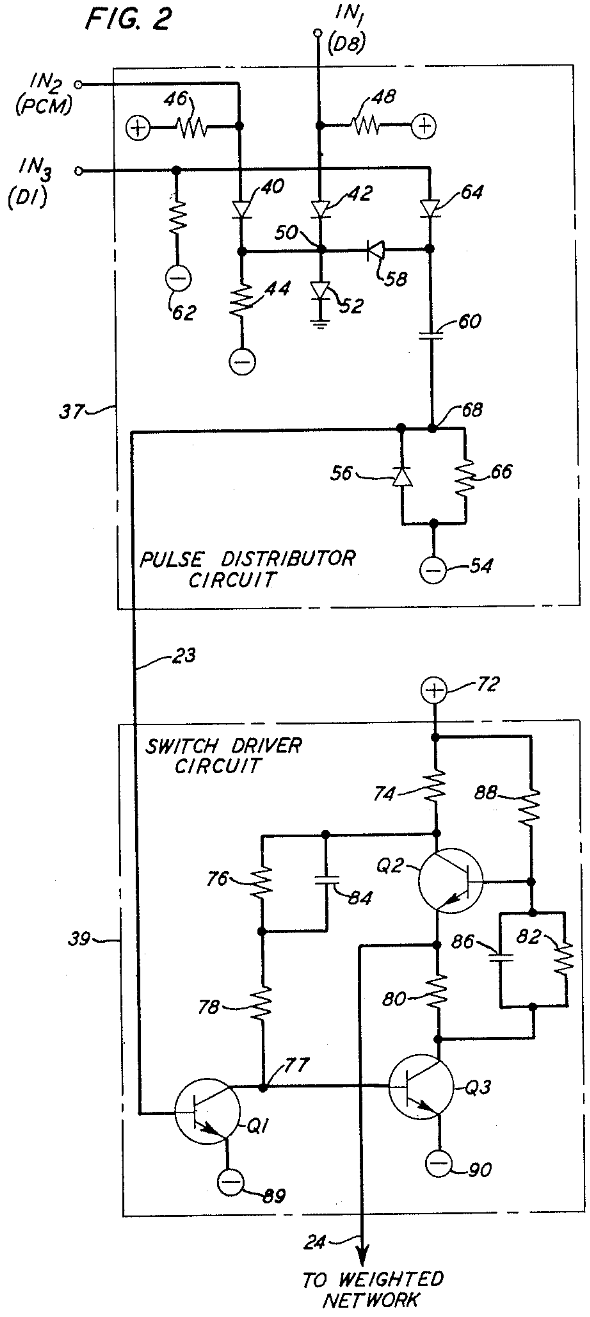
FIG. 2 is a schematic diagram, which is arranged in accordance with the invention and shows one of the distributor-driver combinations of FIG. 1 in detail.

FIG. 2 shows the pulse distributor and switch drivers of FIG. 1 in greater detail. The seven pulse distributor circuits of FIG. 1, not all of which are shown, differ in operation only in that each of their AND gates, which we shall consider in a moment, is open at a different digit time, determined by the terminals D2, D3, . . . D8 of the timing circuit 12.

Each of the pulse distributors of FIG. 1 has an input from the timing circuit 12. This input, as we have seen, is the $IN_1$ input. An input $IN_2$ supplies the incoming PCM wave. These inputs $IN_2$ and $IN_1$, constitute the inputs of an AND gate in each of the pulse distributors. These AND gates are enabled sequentially, if at all, in view of the sequential pulsing of the timing inputs D2–D8. For example, the AND gate for the pulse distributor #1 can be enabled only at time D2 and, then, only if a pulse is present in the incoming PCM wave.

We need only consider one of the distributor-driver combinations of FIG. 1 in detail, since the others operate in similar fashion. By way of example, therefore, the distributor-driver combination 37–39 has been chosen for detailed consideration in FIG. 2.

Let us assume that a PCM pulse appears on the input lead $IN_2$ at time D8, at which time the input $IN_1$ is impulsed by the D8 terminal of the timing circuit 12 of FIG. 1. We shall now consider the process whereby this coincidence of pulses will ultimately (at the next D1 time) cause the switch 29 of FIG. 3 to be enabled. We may note first, however, that the incoming PCM pulses (at $IN_2$) and the timing pulses (at $IN_1$) are all negative-going pulses. Our diode switches are poled accordingly. We shall see later that the special timing pulse D1 is a positive pulse biased negatively.

Let us continue now with our discussion of FIG. 2. The PCM pulse that we have assumed present at the input $IN_2$ at time D8, since it is negative-going, reverse-biases the diode 40. At the same time, a D8 timing pulse at the input $IN_1$ reverse-biases the diode 42. The resistors 46 and 48 provide bias for the PCM and the D8 timing pulses, respectively. (The diodes 40, 42 and the resistor 44 comprise an AND gate, current being provided for the gate by way of the resistor 44.) Now, since the diodes 40 and 42 are in an open condition, the AND gate is enabled and a negative-going pulse appears at the juncture 50. This juncture is clamped to ground by the diode 52 when the gate is not operating.

Because the juncture 50 is at a negative potential, current flows from the source 54 (less negative in potential) and through the diodes 56 and 58. The effect of this current is to charge the capacitor 60 to a negative voltage. We should note at this point that the storage of information on a capacitor does not require that a positive charge be stored on it in the traditional sense, for we see that in the present situation our stored information (that a PCM pulse is present at time D8) is represented by a negative charge.

At time D1 (the next time slot), a D1 timing pulse, which is positive and biased negatively by the source 62, is applied to the input $IN_3$. The D1 timing pulse proceeds through the diode 64 and discharges the capacitor 60. This discharge current produces a positive spike across the resistor 66, and the positive spike, in turn, causes the transistor Q1 of the switch driver 39 to conduct.

If there had not been a coincidence of a D8 timing pulse at $IN_1$ and a PCM pulse at $IN_2$, the AND gate, composed of the diodes 40, 42 and the resistor 44, would not have been enabled. Accordingly, the junction 50 would not have gone negative, and the capacitor 60 would not have received a negative charge. Being therefore at ground potential, the capacitor 60 would have rendered the next D1 timing pulse impotent to produce a positive spike across the resistor 66, and the transistor Q1 would thus not have been turned ON.

The normal condition of the switch driver 39 is with the transistor Q3 turned ON and the transistors Q1 and Q2 turned OFF. Now, when the transistor Q1 has been turned ON by a positive spike appearing at the juncture 68 of the pulse distributor 37, a negative pulse appears at its collector 77. This negative pulse turns the transistor Q3 OFF.

When the transistor Q3 is turned OFF, its collector operates the switch 29 of FIG. 3. And, as we have seen, reference current flows from the source 26 through the resistor 32 and the resistor 34. The voltage thus produced across the resistor 34 represents the digit ($2^0$) which was detected in the pulse distributor circuit 37 at time D8.

The normal (ON) condition of the transistor Q3 is maintained by the bias source 72 in conjunction with the resistors 74, 76, and 78. The base of the transistor Q3 is not allowed to go more negative than the voltage 89, which is slightly more negative than the voltage 90. This lower limit is maintained by the collector-emitter path of the transistor Q1, which thus serves as a diode.

We have noted that the transistor Q3 is biased by the resistors 74, 76, and 78. When the transistor Q3 is thus turned ON, its collector is very close to the potential of the source 90. (The resistor 80 is the load resistor of the transistor Q3.) The resistors 82 and 88 act as a voltage divider and provide a base bias for the transistor Q2. When the transistor Q3 is turned ON, as it normally is, the transistor Q2 is turned OFF since the potential at its base is negative with respect to that of its emitter.

We have seen how a PCM pulse appearing in the eighth time slot of an incoming code group causes the transistor Q1 to be turned ON. The resultant negative pulse at the collector of the transistor Q1 begins to turn the transistor Q3 OFF and, in doing so, produces a positive pulse at the collector of Q3. This pulse, coupled for speedy transmission to the base of the transistor Q2 by the capacitor 86, turns the transistor Q2 ON. The negative pulse, which consequently appears on the collector of the transistor Q2, proceeds swiftly by way of the capacitor 84 and resistor 78 to help turn the transistor Q3 completely OFF. The capacitors 84 and 86, as has been intimated, permit speedy switching action between the transistors Q2 and Q3.

We have noted that when the switch driver 39 is in its normal state, the transistor Q3 is turned ON and the transistors Q1 and Q2 are turned OFF.

In the abnormal state of the switch driver 39, the transistor Q3 is turned OFF, and the transistors Q1 and Q2 are turned ON. Once the transistor Q3 is turned OFF, it will stay in this state for a time determined by the time constant of the capacitor 84 and the resistor 78. At the expiration of this time, the switch driver 39 will revert to its normal state, in which state it will remain until a D1 timing pulse again is enabled to turn the transistor Q1 ON. The switch driver 39 is therefore a monostable circuit, its stable state being what we have thus far called its normal state and its unstable state being what we have called its abnormal state.

The embodiment which we have considered was chosen for purposes of illustration and not to limit the spirit and scope of the invention.

What is claimed is:

1. In a decoder for the digital-to-analog conversion of an incoming pulse train, a serial-to-parallel pulse distribution assembly which comprises a plurality of AND gates, means to supply the incoming pulse train to all of said gates simultaneously, timing means to pulse each of said gates in sequence, a separate storage capacitor connected to each of said gates to receive a charge whenever the gate passes a pulse, a separate distributor output lead connected to each of said storage capacitors, and means to discharge all of said storage capacitors into their respective distributor output leads simultaneously after all of said gates have been pulsed, a separate switch driver for each of said distributor output leads, each of said switch drivers comprising a source of direct current, a pair of transistors of like conductivity type having their emitter-collector paths connected in series in the forward direction between opposite sides of said source, positive feedback paths connected from the collector electrodes of each of said transistors to the base electrode of the other, and a driver output lead connected to the junction between the emitter-collector paths of said transistors remote from said source, means to trigger each of said switch drivers whenever a storage capacitor of said distribution assembly is discharged into its associated distributor output lead, a source of reference current, a separate switch operated from each of said divider output leads, and a weighted summing network connected to receive current from said source through said switches to derive the analog version of the incoming pulse train.

2. A serial-to-parallel distribution assembly for an incoming pulse train which comprises a plurality of AND gates, means to supply the incoming pulse train to all of said gates simultaneously, timing means to pulse each of said gates in sequence, a separate storage capacitor connected to each of said gates to receive a charge whenever the gate passes a pulse, a separate output lead connected to each of said storage capacitors, and means to discharge all of said storage capacitors into their respective output leads simultaneously after all of said gates have been pulsed.

3. A push-pull multivibrator which comprises a source of direct current, first and second transistors of like conductivity type having their emitter-collector paths connected in series in the forward direction between opposite sides of said source, positive feedback paths connected from the collector electrodes of each of said transistors to the base electrode of the other, and an output lead connected to the junction between the emitter-collector paths of said transistors remote from said source, whereby said transistors conduct in alternation and current flows from said source into said output lead through said first transistor while said first transistor is conducting and into said source from said output lead through said second transistor while said second transistor is conducting.

4. A push-pull multivibrator in accordance with claim 3 in which each of said positive feedback paths comprises the parallel combination of a resistor and a capacitor.

5. A push-pull multivibrator which comprises a source of direct current, first and second transistors of like conductivity type having their emitter-collector paths connected in series in the forward direction between opposite sides of said source, a first current limiting resistor connected in series between the collector electrode of said first resistor and said source, a second current limiting resistor connected in series between the emitter electrode of said first transistor and the collector electrode of said second transistor, positive feedback paths connected from the collector electrodes of each of said transistors to the base electrode of the other, and an output lead connected to the junction between said second current limiting resistor and the collector electrode of said second transistor, whereby said transistors conduct in alternation and current flows from said source into said output lead through said first transistor while said first transistor is conducting and into said source from said output lead through said second transistor while said second transistor is conducting.

6. A push-pull multivibrator in accordance with claim 5 in which each of said positive feedback paths comprises the parallel combination of a resistor and a capacitor.

References Cited in the file of this patent

UNITED STATES PATENTS 2,827,233 Johnson et al. ---------- Mar. 18, 1958